Patented June 21, 1938

2,121,442

UNITED STATES PATENT OFFICE 2,121,442

PROCESS OF MANUFACTURING CULTURE

Frederic W. Nordsiek, New York, N. Y., assignor, by mesne assignments, to The Sanoderm Company, Inc., New York, N. Y., a corporation of New York No Drawing. Original application August 4, 1934, Serial No. 738,427. Divided and this application August 5, 1937, Serial No. 157,521

8 Claims. (Cl. 99—59)

This invention relates to a process of making a mixed culture of bacteria suitable for fermenting milk to produce highly palatable and dietetical milk products of yoghurt type and is a division of my application Serial No. 738,427, filed August 4, 1934.

Yoghurt milk is known to have beneficial dietetic properties, but is generally characterized by an unpleasant taste and odor, as well as being in an acid condition. These characteristics prevent the general use of ordinary yoghurt milk despite its valuable dietetic properties.

An object of the invention, therefore, is to provide an improved culture and process of preparing the same by means of which milk products lacking in the undesirable characteristics of yoghurt milk may be produced.

Further objects of the invention will be apparent as it is described in great detail.

At the outset, the invention proposes to produce milk cultures of bacteria prepared from pure cultures of *Lactobacillus acidophilus* and *Streptococcus thermophilus*. Cultures of *Lactobacillus acidophilus* are obtainable from the New York State Agricultural Experiment Station at Geneva, New York, Dr. C. S. Peterson's numbering of satisfactory cultures being as follows:

No. 33 Farr (#FF) Acidophilus milk
No. 35 Myers Acidophilus milk 1929
No. B1 U. S. D. A. milk Cultures of this organism may be carried in tubes containing 10 cc. of skim milk sterilized in the autoclave at 15 pounds for 20 minutes. At each transfer, 1 cc. of the culture is transferred to a tube of sterile milk by means of a sterile glass pipette.

When first received these cultures are grown at 37 degrees centigrade. They are then habituated to 40 degrees centigrade by slowly raising the incubation temperature over a period of several weeks. During this preliminary work the cultures are incubated until firmly coagulated and then held in an icebox or other suitable cooling chamber until the next transfer.

After being habituated to 40° centigrade cultures of *Lactobacillus acidophilus* must meet the following requirements:

1. With 5% inoculation they must coagulate sterile milk in seven hours at 40° centigrade.
2. There must be no unpleasant taste, odor or consistency.
3. They must be adapted to growth in equilibrium with *Streptococcus thermophilus*, as explained hereinafter.

Pure cultures of *Streptococcus thermophilus* are obtainable commercially, being identified as "*Streptococcus Thermophilus* 4915". This organism is cultivated and acclimatized to 40° centigrade in the manner outlined above for the culture of *Lactobacillus acidophilus*. The culture must produce no unpleasant flavor or odor and must grow satisfactorily in equilibrium with *Lactobacillus acidophilus*, as explained hereinafter.

The preparation of a mixed culture is effected by mixing one cubic centimeter each of suitable cultures of *Lactobacillus acidophilus* and *Streptococcus thermophilus*, these quantities being added to tubes containing 10 cc. of autoclave sterilized skim milk, shaken thoroughly and incubated at 40° centigrade for seven hours.

After initial mixing, these cultures are carried by transferring 1 cc. to a sterile milk tube, incubating at 40° centigrade for five hours and thereupon storing at a sufficiently low temperature to prevent further growth in a refrigerator.

The equilibrium of the mixed cultures is observed and controlled by means of stained smears examined under the microscope. A culture which is satisfactorily balanced shows approximately equal numbers of cocci and rods. If either organism shows marked and continued diminution of numbers, it may be remedied by adding, at the next transfer, 1 cc. of a pure culture of the lacking organism.

The mother culture used in carrying out the process of the present invention is obtained by autoclaving whole milk in Erlenmeyer flasks, the size of which depend upon how much of the finished product is to be made. These are inoculated with 10% of a mixed culture from a tube culture, incubated at 40° centigrade for five hours, and immediately transferred to the icebox. Before use, mother cultures are examined microscopically to insure a proper equilibrium between the cocci and rods.

Milk products may be produced through the use of this mixed culture of bacteria, for example, in the following manner: Preparation of the milk product is accomplished by heating whole milk to a sterilizing temperature of approximately 100° C. in a double boiler or steam-jacketed kettle for one-half to one hour, after the addition of 1% whole milk powder. This milk powder is added before heating and, during heating, .5% gelatin is added.

After preparation as above, the milk is cooled to 40° centigrade and 7% by volume of the mother culture is intimately mixed with it. The product is then passed through a fine sieve and filled aseptically into sterile jars, which are incubated at 40° centigrade for four hours and then transferred to the icebox or refrigerator. After twenty-four hours the product is ready for consumption.

Unless otherwise stated, all percentages are by weight. The product produced with the use of my improved bacterial culture, is practically acid-free and devoid of the characteristic disagreeable odor and taste commonly associated with yoghurt milk. By maintaining the foregoing mixed culture in a balanced state, neither organism can produce the disagreeable characteristics in the final state, and the pleasant odor and taste noted above results.

I claim:

1. The process of preparing a mixed culture comprising habituating a culture of Lactobacillus acidophilus to 40° C. until it coagulates sterile milk in seven hours with 5% inoculation forming no unpleasant taste, odor or consistency, transferring the culture to a tube of sterile milk, separately habituating a culture of Streptococcus thermophilus to 40° C. until it produces no unpleasant flavor or odor, the two cultures being adapted to grow satisfactorily in equilibrium, combining the two cultures in sterile milk, incubating at 40° C., transferring to sterile milk, incubating at 40° C. and maintaining the mixed culture at low temperature.

2. The process of preparing a mixed culture comprising habituating a culture of Lactobacillus acidophilus to 40° C. until it coagulates sterile milk in seven hours with 5% inoculation forming no unpleasant taste, odor or consistency, transferring the culture to a tube of sterile milk, separately habituating a culture of Streptococcus thermophilus to 40° C. until it produces no unpleasant flavor or odor, the two cultures being adapted to grow satisfactorily in equilibrium, combining the two cultures in sterile milk, incubating at 40° C. for seven hours, transferring 1 cc. to sterile milk, incubating at 40° C. for five hours, and maintaining the mixed culture at low temperature with the cultures in equilibrium.

3. The process of preparing a mixed culture comprising habituating a culture of Lactobacillus acidophilus at 40° C. until it coagulates sterile milk in seven hours with 5% inoculation forming no unpleasant taste, odor or consistency, transferring the culture to a tube of sterile milk, separately habituating a culture of Streptococcus thermophilus to 40° C. until it produces no unpleasant flavor or odor, the two cultures being adapted to grow satisfactorily in equilibrium, combining the two cultures in sterile milk, incubating at 40° C. for seven hours, transferring 1 cc. of sterile milk, incubating at 40° C. for five hours, maintaining in an icebox with the cultures in equilibrium, inoculating a quantity of sterile whole milk with 10% by weight of the mixed culture, incubating at 40° C. for five hours, and transferring to an icebox.

4. The process of preparing a mixed culture comprising separately habituating cultures of Lactobacillus acidophilus and Streptococcus thermophilus to 40° C., combining portions of the cultures in sterile milk and incubating at 40° C.

5. The process of preparing a mixed culture comprising habituating separate cultures of Lactobacillus acidophilus and Streptococcus thermophilus in sterile milk to produce cultures adapted to grow satisfactorily in equilibrium, combining the cultures in sterile milk, incubating at 40° C. and storing at low temperature.

6. The process of preparing a mixed culture comprising habituating separate cultures of Lactobacillus acidophilus and Streptococcus thermophilus in sterile milk to produce cultures adapted to grow satisfactorily in equilibrium, combining the cultures in sterile milk, incubating at 40° C., transferring portions to sterile milk and incubating at 40° C. to produce a mixed culture capable of optimum growth at 40° C.

7. A mixed culture of Lactobacillus acidophilus and Streptococcus thermophilus habituated at 40° C. and in equilibrium, the culture having no unpleasant taste, odor or consistency and being adapted to coagulate sterile milk in seven hours at 40° C. with five per cent inoculation.

8. A mixed culture of Lactobacillus acidophilus and Streptococcus thermophilus capable of optimum growth in equilibrium at 40° C., the culture having no unpleasant taste, odor or consistency.

FREDERIC W. NORDSIEK.